Dec. 14, 1926.
E. H. OVERSMITH
TRUCK BODY
Filed Jan. 8, 1923
1,610,466
2 Sheets-Sheet 1
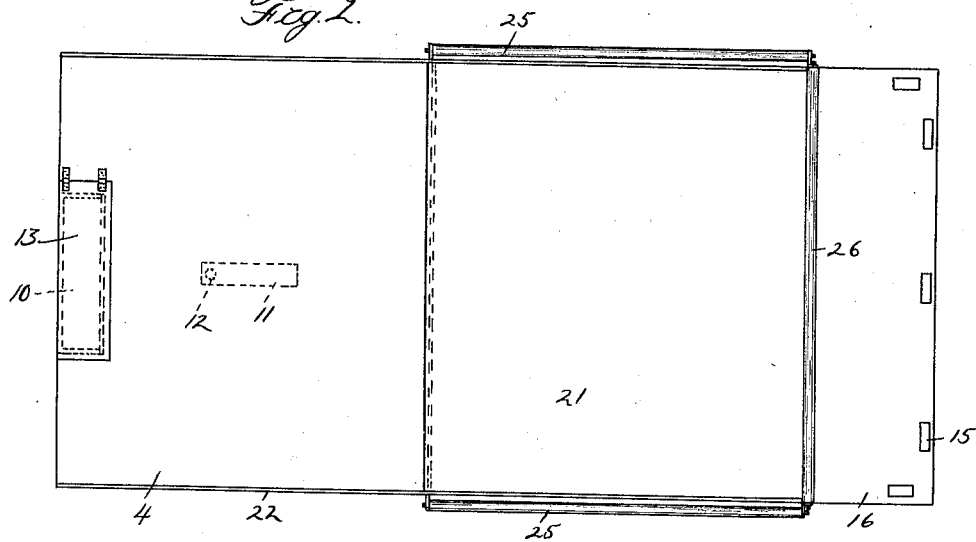
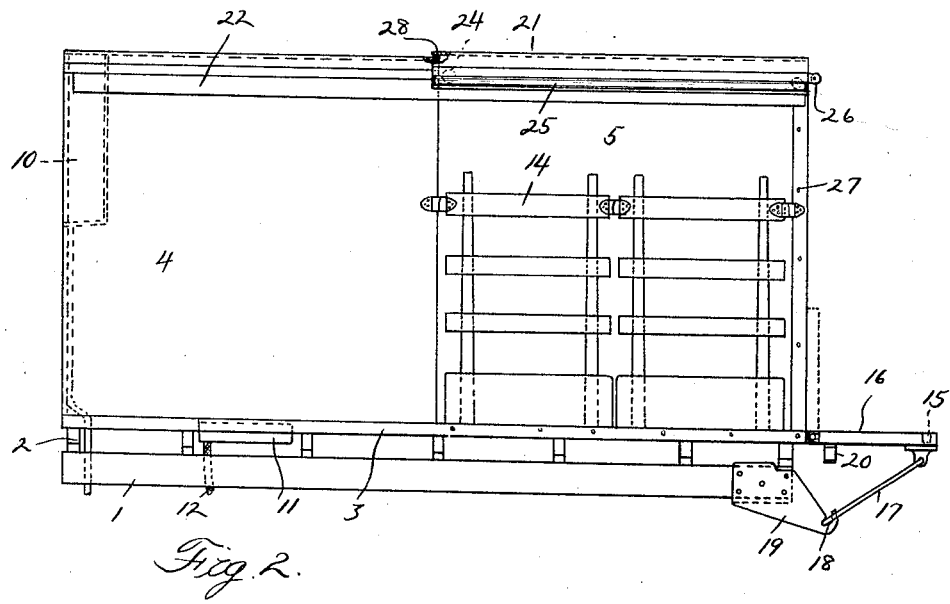
Inventor
Elmer H. Oversmith Dec. 14, 1926.
E. H. OVERSMITH
1,610,466
TRUCK BODY
Filed Jan. 8, 1923
2 Sheets-Sheet 2
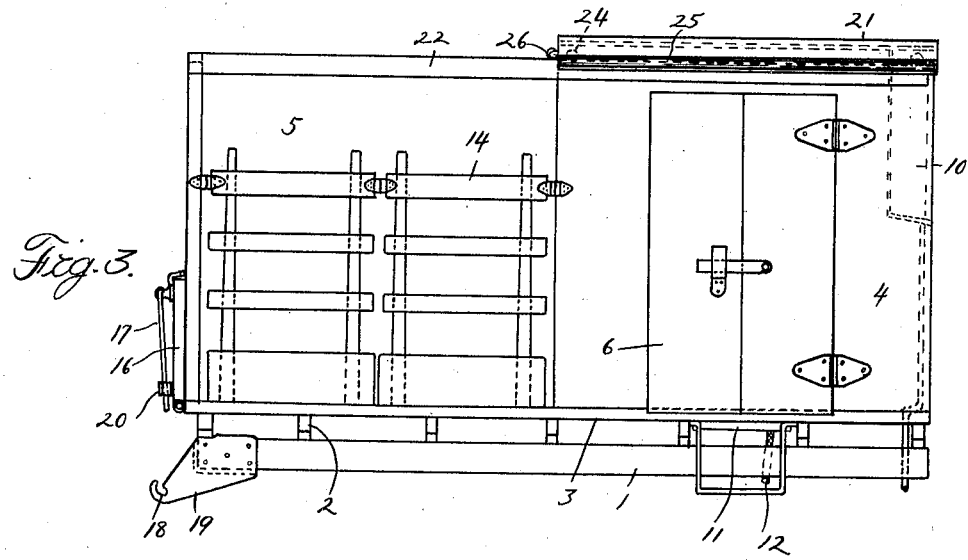
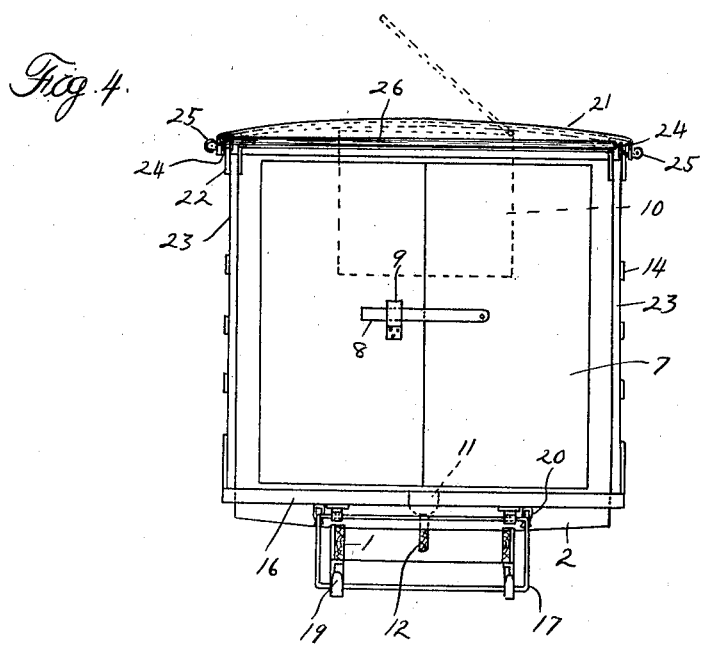
Inventor
Elmer H. Oversmith
Attorneys Patented Dec. 14, 1926.

1,610,466

UNITED STATES PATENT OFFICE.

ELMER H. OVERSMITH, OF CLARENCE, NEW YORK.

TRUCK BODY.

Application filed January 8, 1923. Serial No. 611,415.

The invention relates to truck bodies and has for its main object the provision of a truck body having a closed compartment occupying a portion only of the platform and an adjustable cover for the unoccupied portion of the platform, whereby all of the platform may be covered. Another object is the provision of an extensible cover which carries extensible side and end closures whereby within a very short time the whole of the truck body may be readily inclosed by one person. A further object is the provision of a tail gate which in one of its positions will form an extension of the platform of the truck body. The invention has for other objects the novel features of construction and combinations and arrangements of parts as more fully hereinafter set forth.

In the drawings:

Figure 1 is a plan view of a truck body embodying my invention;

Figure 2 is a side elevation thereof;

Figure 3 is another side elevation showing the adjustable cover in a different position;

Figure 4 is a rear elevation thereof.

1 are the longitudinally extending body sills adapted to be mounted upon the truck frame, 2 are the cross bolsters upon the body sills, and 3 is the platform of the truck body upon the cross bolsters. This truck body has the closed compartment 4 and open compartment 5 preferably occupying respectively the front and rear portions of the platform, the closed compartment having permanent front and side walls, and a permanent top, one of the side walls having a door 6. The rear wall of the closed compartment 4 is formed by means of the doors 7 which are hinged upon the permanent side walls and are adapted to be held in closed position by suitable means such as the lock bar 8 and lock bar clamp 9.

The closed compartment 4 is provided with the ice chamber 10 which is mounted upon the front wall and near its upper end, and is also provided with the heating chamber 11 located therebelow and preferably connected to the exhaust of the truck engine by the conduit 12. 13 is a trap door for the ice chamber located preferably in the permanent top of the closed compartment. Since the mediums for cooling or heating the closed compartment of the truck body do not come in contact with its interior, the contents of the closed compartment will not be contaminated by the cooling or heating mediums and furthermore, the closed compartment may be more easily maintained in clean condition.

The open compartment 5 of the truck body as shown in the present instance has the side stake racks or closures 14, the uprights of which detachably engage in sockets in the platform 3. An end stake rack or closure may also be provided having its uprights detachably engaging in the sockets 15 located in the tail gate 16, which is pivoted upon the truck body and is adapted in one position to form an extension of the platform 3. The tail gate is held in alignment with the platform by means of the rectangular brace 17 pivotally connected to the free end of the tail gate and adapted to rest in the slots 18 formed in the supports or rests 19 which are secured to the body sills 1. When the tail gate is locked in upright or vertical position, the side arms of the brace are detachably held in the clips 20 upon the tail gate.

21 is a sliding cover movable longitudinally of the truck body and mounted upon a track comprising the rails 22 secured to the permanent side walls of the closed compartment and the uprights 23 at the rear corners of the platform. The rollers 24 are preferably provided for facilitating the movement of the sliding cover. This cover carries at its sides the curtain rolls 25 and at its rear the curtain roll 26 so that upon the cover being moved rearwardly from over the closed compartment 4 of the truck body to a position over the unoccupied portion of the platform, its side and end curtains may be pulled downwardly to completely inclose the open compartment 5 of the truck body. Suitable snaps 27 are provided upon the uprights 23, the permanent side walls of the closed compartment 4 and the platform 3 for securing the curtains in their extended positions.

For the purpose of preventing water running along the permanent top of the closed compartment 4 and passing over its rear end when the sliding cover 21 has been moved to extended position over the open compartment 5, I have provided the upwardly extending projection or lip 28 at the rear end of the permanent top, which does not, however, interfere with the telescoping of the sliding cover over the permanent top From the above description, it will be readily seen that I have provided a novel form of truck body having a platform, a portion only of which is occupied by a closed compartment, the remaining portion of the platform being adapted to be inclosed if desired. Also, that I have provided an extensible cover comprising the permanent top of the closed compartment and a sliding cover telescopically engageable with the permanent top and adapted to be extended over the portion of the platform not occupied by the closed compartment; a sliding cover carrying extensible side and end closures for completely inclosing the unoccupied portion of the platform; and doors forming an end wall of the closed compartment and adapted to be opened to place the closed compartment in full communication with the open compartment. Furthermore, that I have provided a tail gate which in one position forms an extension of the platform and which in this position is adapted for detachable engagement with an end stake rack or closure. Thus, in effect, I have provided a convertible truck body which may be used as a refrigerator, van, stake truck body or in combination.

What I claim as my invention is:

1. In a truck body, the combination with the platform, of a tail gate pivotally connected thereto and formed with transversely extending sockets for detachably receiving a stake rack, a brace pivotally connected to said tail gate and a bracket upon said platform for receiving said brace with its upper face in substantial alignment with the upper surface of said platform.

2. A truck body having an open top compartment including posts at one end of said body, and a permanently closed top compartment, rails carried by the closed compartment secured to said posts, and a cover for the open top compartment movable on said rails over the closed compartment.

3. The combination with a truck body having a platform, and a tail gate connected to said platform so as to form a rearward extension thereof when in a predetermined position, of means for supporting the tail gate in such extended position including a bracket carried by the platform, and a brace for the gate engageable with said bracket.

4. In a truck body, the combination with the platform of a permanently closed compartment occupying a portion only of said platform, an open compartment, and a cover carried by the closed compartment adapted to be extended over said open compartment and carrying side and end closures.

5. In a truck body, the combination with the platform of a closed compartment occupying a portion only of said platform and having permanent front and side walls, rails secured to the permanent side walls of the closed compartment, a cover movable longitudinally of said truck body and supported upon said rails, and curtain rolls carried at the sides and an end of said cover.

In testimony whereof I affix my signature.

ELMER H. OVERSMITH.